United States Patent [19]

Mahato et al.

[11] 4,323,470
[45] Apr. 6, 1982

[54] BATTERY PASTE FOR LEAD-ACID STORAGE BATTERIES

[75] Inventors: Basanta K. Mahato, Brown Deer; Edwin C. Laird, Sussex, both of Wis.

[73] Assignee: Globe-Union Inc., Milwaukee, Wis.

[21] Appl. No.: 180,883

[22] Filed: Aug. 25, 1980

[51] Int. Cl.³ .................. H01M 4/62; H01M 4/56
[52] U.S. Cl. .................. 252/182.1; 429/225; 429/228
[58] Field of Search .................. 252/182.1; 429/225, 429/228

[56] References Cited

U.S. PATENT DOCUMENTS 3,859,114  1/1975  Pepper et al. .................. 429/225
4,110,241  8/1975  Georgievich et al. .................. 252/182.1

FOREIGN PATENT DOCUMENTS 509922  1/1976  U.S.S.R. .................. 252/182.1

*Primary Examiner*—Benjamin R. Padgett
*Assistant Examiner*—Irwin Gluck
*Attorney, Agent, or Firm*—John Phillip Ryan; Joseph J. Jochman, Jr.

[57] ABSTRACT

A lead-acid storage battery paste containing an inorganic glass fiber extender or bulking agent up to 6.5% by weight of leady oxide. The extended negative active mass helps to reduce its lead content by about 14 weight % without affecting the lead-acid battery performance.

6 Claims, 7 Drawing Figures

SCALE: ⊢—⊣ 10μ

SCALE: ⊢—⊣ 5μ

BATTERY PASTE FOR LEAD-ACID STORAGE BATTERIES

BACKGROUND OF THE INVENTION

There has been a continuing interest in improving the electrode active material quality in lead-acid storage batteries to increase energy efficiency and operational life. Various additives, commonly referred to as expanders, have been used particularly in the paste for making negative battery plates. Expanders improve the efficiency of utilization of the active materials, particularly, the high rate, low temperature discharge capacity and the operational life of the battery.

In a typical SLI battery (automotive starting, lighting and ignition), efficiency of utilization of the negative electrode active material is generally substantially less than the positive. For example, in 20-hour rate discharge of 50 A-hour SLI batteries, the utilization efficiency of negative active material is about 53% to 59% of the positive active material. This low efficiency of negative electrodes is due to various factors such as the design of the battery, that is, the number of negative plates in a cell generally exceeds the number of positives by one, the need to maintain some minimum grid thickness for handling, and difficulties in preparing and controlling the active material morphology. While the electrical conducitivity of negative active material is higher than that of positive active material, the expected higher utilization efficiency of negative material has been to-date offset by an active material morphology in which the surface area of the negative active material is an order of magnitude less than for the positive. The effective surface area of the active material is known to control the cold performance (low temperature high rate discharge capacity) and for this reason an excess amount of negative active material is provided. This condition, causes the cell to be limited by the positive electrodes under normal operation. Under conditions such as very low temperature and higher discharge rates, however, the cell becomes negative-limited. Examination of failed batteries usually reveals negative plates to be in exceptionally good condition at the time of failure, the end of battery life having been caused by failure of the positive plates.

Efforts have been made to improve the performance of negative electrodes by incorporating the additives as suggested in U.S. Pat. Nos. 3,523,041, 3,446,670, 3,481,785 and 3,480,478, and British Pat. No. 1,307,221. Others have suggested preparing a low density paste, as for example, U.S. Pat. Nos. 3,496,030, 3,702,265 and 3,765,943. While some of the above patents disclose improved cold performance of the negative active material, none has obtained improved material utilization efficiency over a wide range of temperatures and discharge currents or an effective means of reducing metallic lead content in sponge lead electrode.

More recently, published West German patent application No. 2,724,839 has disclosed the addition of starch-coated glass fibers in an amount ranging from 0.25 to 0.5% of the active mass. The fiber lengths disclosed therein range from 8 to 15 mm and the diameters from 8 to 15 microns.

SUMMARY OF THE INVENTION

It is an object of the present invention to provide a lead-acid type storage battery paste which will provide light weight negative active material with improved electrode performance, i.e. increased material utilization efficiency over a wide range of temperature and discharge rates, and cycle life. Inclusion of such extender in the paste will also increase the mechanical strength and, in turn, the handling characteristics of the electrodes.

A further object of the invention is to provide a lead-acid battery paste containing decreased amounts of lead without sacrificing plate performance.

These and other objects and advantages of the present invention will become more apparent from the detailed description which follows.

Basically, the invention comprises a paste for a lead-acid storage battery which includes a fibrous material up to 6.5% as bulking agent and microstructure modifier.

DESCRIPTION OF THE PREFERRED EMBODIMENT

Figure 1:
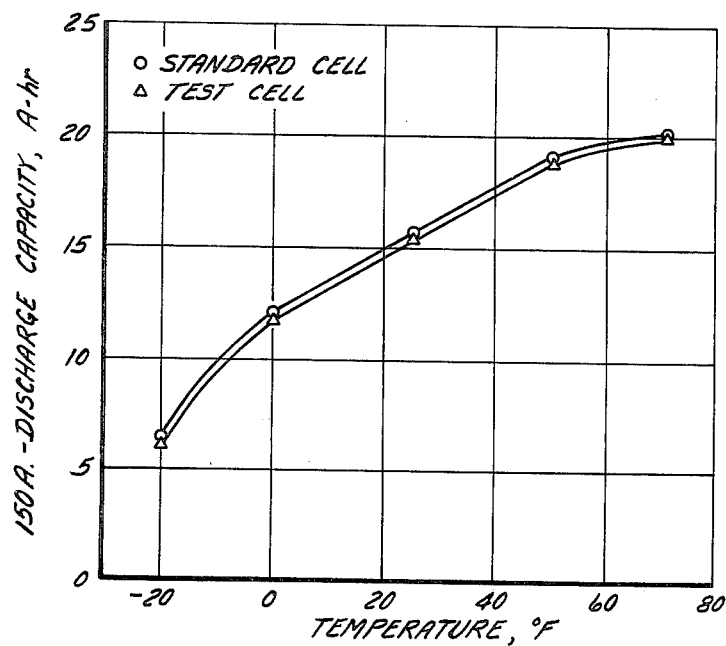
FIG. 1 is a graph showing battery performance, measured by discharge capacity, with changing temperature for a standard construction cell and one made with the improved extender of the subject invention.

The invention basically comprises the addition of uniformly distributed milled glass fibers to conventional battery paste. For reasons, not fully understood, the fibers appear to effect the microstructure of the lead paste markedly increasing the available surface area of the paste material. This, at least partly, could be attributed to low dissolution rate of glass fiber in battery acid. The glass fiber having a surface area 0.135 $m^2/gm$ does not physically influence the surface area of active material matrix. This increase in surface area accounts for the improved material utilization and specific capacity as will be discussed hereinafter. The glass fibers utilized are manufactured by Owens-Corning Fiberglass Corporation and range in size from about 1/32 inch to ¼ inch (0.8 to 6.4 mm) in length having a diameter of approximately 0.0005 inch (0.013 mm). The following example illustrates the mode of preparation of the battery paste according to the invention.

EXAMPLE 1

A typical lead-acid negative paste for an SLI automotive battery was prepared with a major amount of leady litharge, comprising lead oxide and approximately 30 weight % free lead. The litharge was mixed with minor additions of cellulose fiber, barium sulfate, lignosulfonate expander and channel black, in a total amount of 1.25 weight %, all of which are well known battery paste additives. In this standard paste, there was added 4.33 weight %, based on the weight of the litharge, of the above identified milled glass fibers. Into this mixture was blended distilled water and sulfuric acid in typical amounts and the resulting paste, with an apparent density of 65 to 68 grams per cubic inch (4.0 to 4.2 gm/cc) and a penetrometer reading of 34 to 38, was used to prepare pasted plates. The pasted plates were cured and formed in a conventional manner to produce the final negative sponge lead matrix.

Table I, below, is a comparison of the physical parameters of the negative active material of a 50 A-hour capacity test cell, as previously described, with those of a standard paste composition having all of the same ingredients with the exception of the milled glass fiber.

TABLE I

| Negative Active Material Parameters | Standard | Test |
|---|---|---|
| Gross Weight, gm | 370.9 | 332.8 |
| weight of sponge lead, gm | 366.1 | 314.5 |
| weight of milled fiber glass, gm | — | 14.3 |
| weight of expander, gm | 4.8 | 4.0 |
| content of lead, weight % | 98.7 | 94.5 |
| density, gm/cm$^3$ | 4.05 | 3.52 |
| porosity, cc/cc | 0.63 | 0.59 |
| approx. surface area, m$^2$/gm | 0.53 | 0.81 |

Note that the test cell has about 14% less lead active material than the standard. Table II, below, sets forth a comparison of the discharge performance of a test cell constructed with the paste previously described and a cell using the standard paste material.

TABLE II

Comparison of Discharge Behavior of a Test Cell and a Standard Cell

| Discharge Conditions | Test Cell | Standard Cell |
|---|---|---|
| 2.5 A, 70° F. | 19.74 hrs. | 20.27 hrs. |
| 25 A, 70° F. | 82.1 min. | 83.5 min. |
| 150 A, 70° F. | 475 sec. | 465 sec. |
| 150 A, 50° F. | 447 sec. | 434 sec. |
| 150 A, 25° F. | 366 sec. | 374 sec. |
| 150 A, 0° F. | 270 sec. | 271 sec. |
| 150 A, −20° F. | 139 sec. | 156 sec. |
| 300 A, 0° F. | 79 sec. | 90 sec. |

Figure 2:
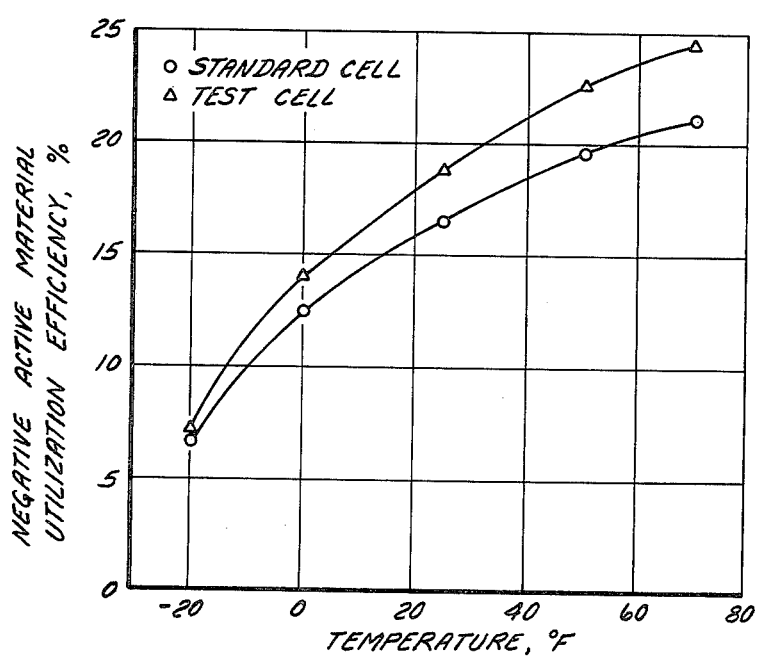
FIG. 2 is a graph similar to FIG. 1 showing comparative cell performance in terms of active material utilization efficiency.

The results of Table II are plotted in FIG. 1 which shows a comparison of the high rate discharge capacity of the test cell and the standard cell as indicated. It can be seen that the test cell, although containing substantially less lead than the standard cell, had essentially the same performance characteristics. FIG. 2 is a comparative plot of the utilization efficiency of the active material contained in the test cell as compared to the standard cell under various temperature conditions at a discharge rate of 150 amps. Similar results were obtained at low rates of discharge indicating that the paste material prepared according to the invention, although containing less active lead material, performed at increased efficiency and thereby matched the standard cell in overall performance. Thus, the material made according to the invention enables battery construction containing less lead, which comprises one of the costliest and heaviest components of batteries, and results in a significant cost reduction and lower weight without sacrificing performance.

Figure 3:
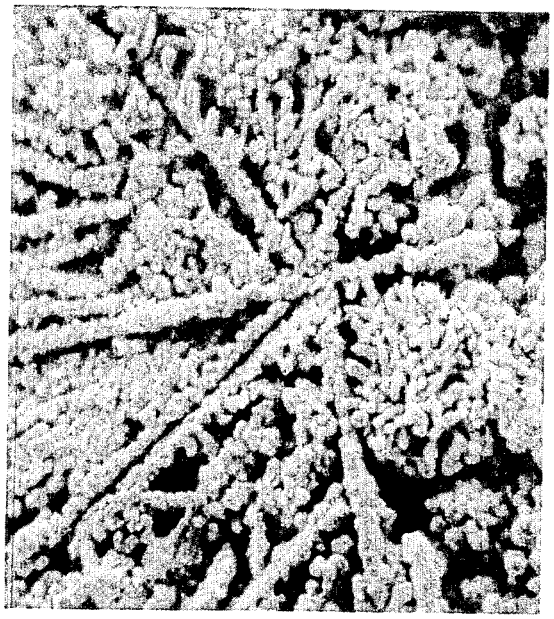
FIGS. 3 and 4 are surface and cross section photomicrographs, respectively, of standard negative active material.
Figure 4:
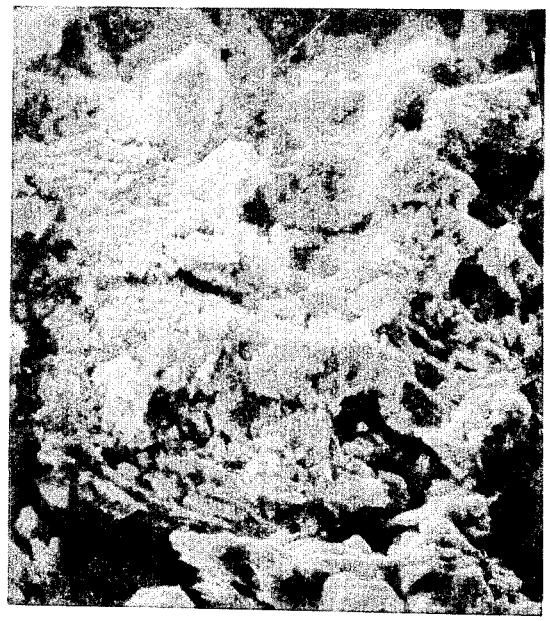
Figure 5:
FIGS. 5 and 6 are photomicrographs similar to FIGS. 3 and 4 of the improved negative active material.
Figure 6:

FIGS. 3 and 4 are photomicrographs of the surface area and cross section, respectively, of the standard negative active material. It can be seen that the microstructure of the standard material is composed of highly branched dendrites which are densely packed. FIGS. 5 and 6 are photomicrographs of the surface area and cross section, respectively, of the paste material prepared according to the invention illustrating the effect of the glass fibers on the microstructure. It can be seen that the paste formulated according to the invention comprises plate and needle shaped dendrites which are loosely packed thereby resulting in an increased surface area of the material. In the lower portion of FIG. 5, the cylindrical object appearing therein is one of the glass fibers. It can be seen that the fibers, while they do not react chemically with the paste material, apparently act to prevent the formation of large dendrites. The reason for this is not fully understood.

EXAMPLE 2

More recently, increased attention has been devoted to the development of lead-acid batteries for use in electric vehicles. Unlike the basic requirements of high rate and shallow depth of discharge for SLI automotive battery application, electric vehicle batteries require low rate, deep discharge performance and extended cycle life. As a result, active material paste formulations for electric vehicle batteries are varied somewhat from those used in the manufacture of SLI batteries.

To test the efficacy of milled fiber glass additions in the active material for negative plates in the active material for negative plates in electric vehicle batteries, cells were constructed using a paste composition similar to that of Example 1. To the leady litharge mixture was added the same 1.25 total weight % additions as in the Example 1 paste, however, the cellulose fiber was omitted, the lignosulfonate expander fraction was reduced, and the barium sulfate and channel black fractions were increased. For comparative testing, cells were made with and without the milled fiber glass extender. In the paste containing the fiber glass, the concentration was 4.33 weight %.

Table III shows a comparison of the physical characteristics of the active material in the standard cells without milled fiber glass additions and the improved extended cells having 4.33 weight % milled fiber glass. Table III also shows a comparison of the capacities of these cells during deep discharge cycling to 70% depth of discharge, used to simulate their performance in a typical electric vehicle application. As can be seen from the Table, the capacity of the improved cells compared very favorably to that of the standard cells, despite a reduction of 13% in the metallic lead content of the negative electrode of the former. In both sets of cells tested, the positive electrodes were the limiting factor in cycle life.

TABLE III

|  | Standard Cells | Extended Cells |
|---|---|---|
| Dry negative paste/cell | 1645 gm | 1516 gm |
| % Pb in dry paste | 88.15 | 83.30 |
| Amt. of sponge lead/cell | 1450 gm | 1263 gm |
| Amt. of milled fiberglass/cell | — | 65.2 gm |
| Sponge lead surface area | 0.52 m$^2$/gm | 0.74 m$^2$/gm |
| Initial capacity after formation | 152 Ah @ 58A | 172 Ah @ 40A |
| Capacity during deep discharge cycling at 58A |  |  |
| at 51st cycle | 169.9 A-hr. | 170.2 A-hr. |
| at 100th cycle | 156.0 | 155.0 |
| at 130th cycle | 133.2 | 135.9 |
| at 150th cycle | 118.0 | 123.2 |
| Total Cyclic Life | 155–165 | 155–165 |
| Cyclic life limiting electrode | Positive | Positive |

Figure 7:
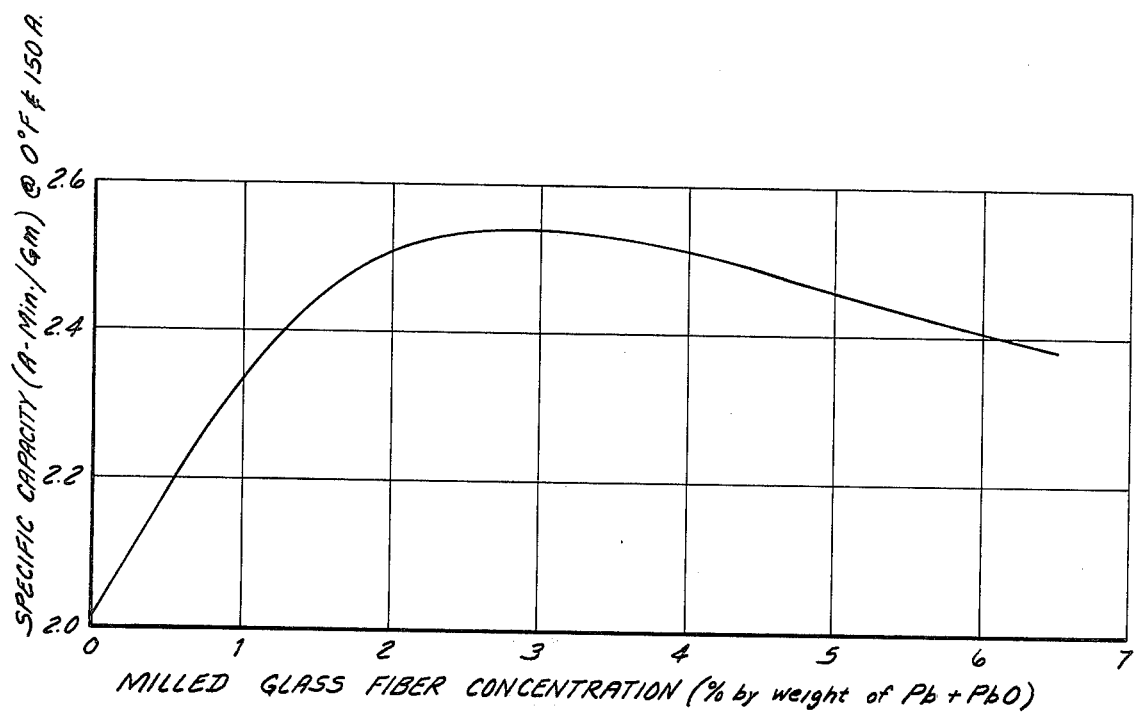
FIG. 7 is a graph showing the change in the specific capacity of the negative active material with variations in the milled glass fiber concentration.

Various other tests were made of the battery paste having fibrous glass particles added thereto in amounts ranging from about 1.50 weight % to 6.50 weight %. When the glass material was present in amounts over 6.5%, the rheology of the paste changed radically, making it difficult to apply paste to the battery grid with conventional pasting techniques. Additionally, the 6.5% mixture did not result in any greater electrochemical utilization of the lead. Below about 1.5 weight %, the specific capacity of the active material dropped quite substantially. FIG. 7 shows the effect of milled glass fiber concentration on the specific capacity of the negative active material at low temperature (0° F.).

The term "milled glass fibers" used herein is generally accepted in the art to denote short length, small diameter fibers of the sizes disclosed herein. Alkali-zinc aluminosilicate glasses, both with and without boron additions, hve been found to be suitable. Other sizes and shapes of glass and substitute synthetic materials have also been examined. For example, fine glass powder less than about 0.5 microns and glass fibers shorter than about 1/32 inch (0.8 mm) were found to be unsuitable because they are dislodged from the active mass and fall out of the battery plates during formation. Fibers having lengths greater than about ¼ inch (6.4 mm) do not mix well in the preparation of the active mass paste. The addition of conductive materials to fibers, for the purpose of enhancing electrical conductivity within the plate, results in unacceptably excessive gassing furing formation. Finally, the substitution of a synthetic polymer fiber, such as Dynel, will not provide proper mixing of the fibers.

We claim:

1. In an active material paste for the negative electrodes of a lead-acid cell comprising a major amount of ready litharge, the improvement comprising the addition of milled glass fibers in an amount ranging from about b 1.5 to about 6.5 weight % of the leady litharge.

2. The invention of claim 1 wherein the milled glass fibers have a length in the range of about 1/32 inch to about ¼ inch.

3. The invention of claim 2 wherein said fibers have a diameter in the range of about 6 to 16 microns.

4. A composition of materials adapted to be mixed with water and sulfuric acid to form an active material paste for the negative electrodes of a lead-acid cell comprising:
   (a) 65 to 75 weight % lead oxide (PbO);
   (b) 25 to 35 weight % free lead;
   (c) 1 to 2 weight %, based on the total weight of (a) and (b), of one or more of the materials selected from the group comprising cellulose fiber, barium sulfate, lignosulfonate and channel black; and,
   (d) 1.5 to 6.5 weight %, based on the total weight of (a) and (b), of milled glass fibers.

5. The composition as defined in claim 4 wherein the milled glass fibers comprise an amount ranging from about 2.0 to 4.5 weight %.

6. The composition as defined in claim 4 wherein the milled glass fibers hve a length in the range of about 1/32 inch to about ¼ inch and a diameter in the range of about 6 microns to about 16 microns.

* * * * *